(12) United States Patent
Ito et al.

(10) Patent No.: US 8,029,067 B2
(45) Date of Patent: Oct. 4, 2011

(54) CUSHION BODY, SEAT, AND METHOD OF MANUFACTURING THE SAME

(75) Inventors: Mika Ito, Tochigi (JP); Yasuchika Takei, Tochigi (JP)

(73) Assignee: TS Tech Co., Ltd. (JP)

( * ) Notice: Subject to any disclaimer, the term of this patent is extended or adjusted under 35 U.S.C. 154(b) by 335 days.

(21) Appl. No.: 12/295,368

(22) PCT Filed: Mar. 29, 2007

(86) PCT No.: PCT/JP2007/056837
§ 371 (c)(1),
(2), (4) Date: Sep. 30, 2008

(87) PCT Pub. No.: WO2007/114237
PCT Pub. Date: Oct. 11, 2007

(65) Prior Publication Data
US 2009/0250992 A1    Oct. 8, 2009

(30) Foreign Application Priority Data
Mar. 31, 2006    (JP) .................... 2006-099628

(51) Int. Cl.
*A47C 7/02* (2006.01)
(52) U.S. Cl. ..................... 297/452.48; 5/952

(58) Field of Classification Search ............. 297/452.48, 297/452.63, 452.22; 5/653, 652, 952, 690
See application file for complete search history.

(56) References Cited

U.S. PATENT DOCUMENTS

| 4,131,705 | A  | * | 12/1978 | Kubinsky ................ 428/106 |
| 5,093,057 | A  | * | 3/1992  | Hara et al. ................. 264/112 |
| 6,875,144 | B2 | * | 4/2005  | Kinoshita et al. .......... 474/260 |
| 7,172,718 | B2 | * | 2/2007  | Tagawa et al. ............. 264/146 |
| 7,874,624 | B2 | * | 1/2011  | Ito et al. .................... 297/452.48 |
| 2003/0027920 | A1 | * | 2/2003 | Kinoshita et al. ........ 524/508 |
| 2008/0284231 | A1 | * | 11/2008 | Takei et al. ............... 297/452.48 |
| 2009/0108494 | A1 | * | 4/2009 | Ito et al. .................... 264/258 |
| 2009/0267401 | A1 | * | 10/2009 | Ito et al. .................... 297/452.58 |
| 2009/0273222 | A1 | * | 11/2009 | Takei et al. ............... 297/452.48 |

FOREIGN PATENT DOCUMENTS

| JP | 8 318066   | 12/1996 |
| JP | 2000 107470 | 4/2000 |
| JP | 2001 054690 | 2/2001 |

* cited by examiner

Primary Examiner — David Dunn
Assistant Examiner — Erika Garrett
(74) Attorney, Agent, or Firm — Schiff Hardin LLP

(57) ABSTRACT

A cushion body which has a force to support a large load and both a soft touch feeling and can maintain an undulation shape of a groove portion and the like provided on a contact surface with a seat occupant favorable, a seat using the same, and a manufacturing method thereof are provided.

8 Claims, 10 Drawing Sheets

(A)

(B)

CUSHION BODY, SEAT, AND METHOD OF MANUFACTURING THE SAME

TECHNICAL FIELD

The present invention relates to a cushion body, a seat, and a method of manufacturing the same, and in particular to a cushion body and a seat using a fibrous structure composed of polyester fibers or the like, and a method of manufacturing the same.

BACKGROUND ART

Conventionally, a seat using a fibrous structure composed of polyester fibers or the like as a cushion body has been known (for example, see Patent Document 1, 2 cited below). The fibrous structure used in the seat described in Patent Document 1 is formed by successively folding a web obtained by dispersing and incorporating thermally adhesive composite short fibers as an adhesive component into matrix fibers composed of an inelastic polyester crimped short fiber assembly in a standing state along its longitudinal direction. That is, this fibrous structure is formed to have a predetermined thickness by folding the web in an accordion shape.

In the seat described in Patent Document 1, each of a seat portion and a seat back portion is constituted by stacking a plurality of this fibrous structures to form a cushion body and coating this cushion body with a cover. Accordingly, in this seat, since the standing direction of the web (a thickness direction of the cushion body) is directed along a load direction during sitting of a seat occupant, excellent ventilation is, of course, secured, a proper hardness to a load direction is provided, and load can be dispersed. Therefore, this seat can provide a soft touch feeling which cannot be obtained by urethane conventionally used in general.

In Patent Document 2, a plurality of fibrous structures are disposed in a stacked and compressed state in a mold having a large number of ventilation holes, and hot air and steam are ventilated through the mold. Thereby, the hot air and steam pass through the mold and the fibrous structures are thermally molded so that a cushion body with a predetermined shape is formed.

Patent Document 1: Japanese Patent Laid Open Publication No. 1996(H08)-318066. Patent Document 2: Japanese Patent Laid Open Publication No. 2000-107470.

DISCLOSURE OF THE INVENTION

Problem to be Solved by the Invention

However, the seat described in Patent Document 1 is favorable for those having a sitting surface and the like of the cushion body with a two-dimensional structure but not sufficient for those with a three-dimensional structure. That is, since with the art in Patent Document 1, an undulation shape such as a groove portion can not be provided in a load contact surface, a seat with a favorable sitting feeling can not be obtained.

On the other hand, in the seat described in Patent Document 2, the undulation shape such as a groove portion can be provided on the sitting surface and the like of the cushion body, but there is a problem that the touch feeling at sitting is hard in order to support a sufficient load.

That is, since the seat described in Patent Document 1 has a structure such that a longitudinal direction of fibers extends along a load direction, it can support a sufficient load while maintaining a soft touch feeling. On the other hand, since the seat described in Patent Document 2 does not have a structure such that a longitudinal direction of fibers extends in a load direction, the cushion body should be molded hard to some extent in order to support the load.

In view of the above problems, an object of the present invention is to provide a cushion body which has a large load supporting force and a soft touch feeling and can maintain the favorable undulation shape of a groove portion and the like provided on a contact surface with a seat occupant, a seat using the cushion body and a method of manufacturing them.

Means for Solving the Problem

An embodiment of the present invention is a cushion body obtained by molding a fibrous structure obtained by mixing main fibers and binder fibers using a mold having a cavity with a predetermined shape, wherein the fibrous structure is formed by stacking a web so that an extending direction of the web in which the main fibers and the binder fibers are blended is along a thickness direction of the fibrous structure and is disposed so that the thickness direction of the fibrous structure is along the thickness direction of the cushion body, a groove portion having a predetermined width in a recess state in the thickness direction of the fibrous structure is formed at the cushion body, and the groove portion is formed so that its widthwise direction forms a predetermined angle or more with a stacking direction of the web constituting the fibrous structure.

Thus, since in the cushion body of the present invention, the fibrous structure is formed by stacking the web so that the extending direction of the web is along the thickness direction of the fibrous structure and the thickness direction of the fibrous structure is along the thickness direction of the cushion body, a large load applied in the thickness direction of the cushion body can be supported. Therefore, since the fibrous structure does not have to be molded with large hardness, a soft touch feeling can be secured. Also, in the cushion body, the groove portion is formed in the recess state in the thickness direction of the fibrous structure and so that a groove widthwise direction forms a predetermined angle or more with the stacking direction of the web. Thus, the groove portion is hard to be opened in the widthwise direction and the favorable shape of the groove portion can be maintained, by which a favorable appearance of the cushion body can be maintained.

Also, the groove portion preferably has its widthwise direction set so as to substantially cross the stacking direction of the web constituting the fibrous structure at a right angle. With such configuration, the groove portion is prevented from being opened in the widthwise direction, and the favorable shape of the groove portion can be maintained.

The seat of an embodiment of the present invention is a seat including a cushion body and a seat frame supporting the cushion body, wherein the cushion body can use any one of the cushion bodies described above.

Also, an embodiment of the cushion body can be manufactured by the method of manufacturing a cushion body from a fibrous structure, comprising at least: a fibrous structure forming step of successively folding a web composed of main fibers and binder fibers for each predetermined length to form a fibrous structure in which the extending direction of the web is along the thickness direction of the fibrous structure; a fibrous structure disposing step of disposing the fibrous structure in a mold having a groove formation portion for forming a groove portion having a predetermined width at the cushion body formed on a mold face in a compressed state so that the thickness direction of the fibrous structure is along the thickness direction of the cushion body, a protrusion direction of the groove formation portion is along the thickness direction of the sheet-like fibrous structure, and the stacking direction of the web constituting the fibrous structure and the widthwise direction of the fibrous structure form a predetermined angle or more; and a molding step of thermally molding the fibrous structure in the mold to form the cushion body.

Also, in the fibrous structure disposing step, the fibrous structure is preferably disposed so that the stacking direction of the web constituting the fibrous structure and the widthwise direction of the groove formation portion substantially cross each other at a right angle.

In the molding step, it is preferable that steam is blown to the fibrous structure through steam holes formed on a mold face of the mold under barometrical pressure higher than atmospheric pressure. In this way, the fibrous structure can be molded in a short time, by which manufacturing time can be reduced. Also, since the time during which the fibrous structure is thermally treated is reduced, a cushion body having a soft texture can be formed.

The seat can be manufactured by a method of manufacturing a seat comprising a cushion body and a seat frame supporting the cushion body, comprising at least: a step of forming the cushion body according to the method of manufacturing the cushion body described above; and a step of attaching the cushion body to the seat frame.

Effect of the Invention

According to an embodiment of the present invention, since the fibrous structure is formed by stacking the web so that the extending direction of the web is along the thickness direction of the fibrous structure and the thickness direction of the fibrous structure is along the thickness direction of the cushion body, a large load applied on the thickness direction of the cushion body can be supported. Also, since the groove portion in the recess state in the thickness direction of the fibrous structure and having the groove widthwise direction forming a predetermined angle or more with the stacking direction of the web is formed in the cushion body, the groove portion is hard to open in the widthwise direction, a favorable shape of the groove portion can be maintained, and a favorable appearance of the cushion body can be maintained.

EXPLANATION OF REFERENCE NUMERALS

Figure 1:
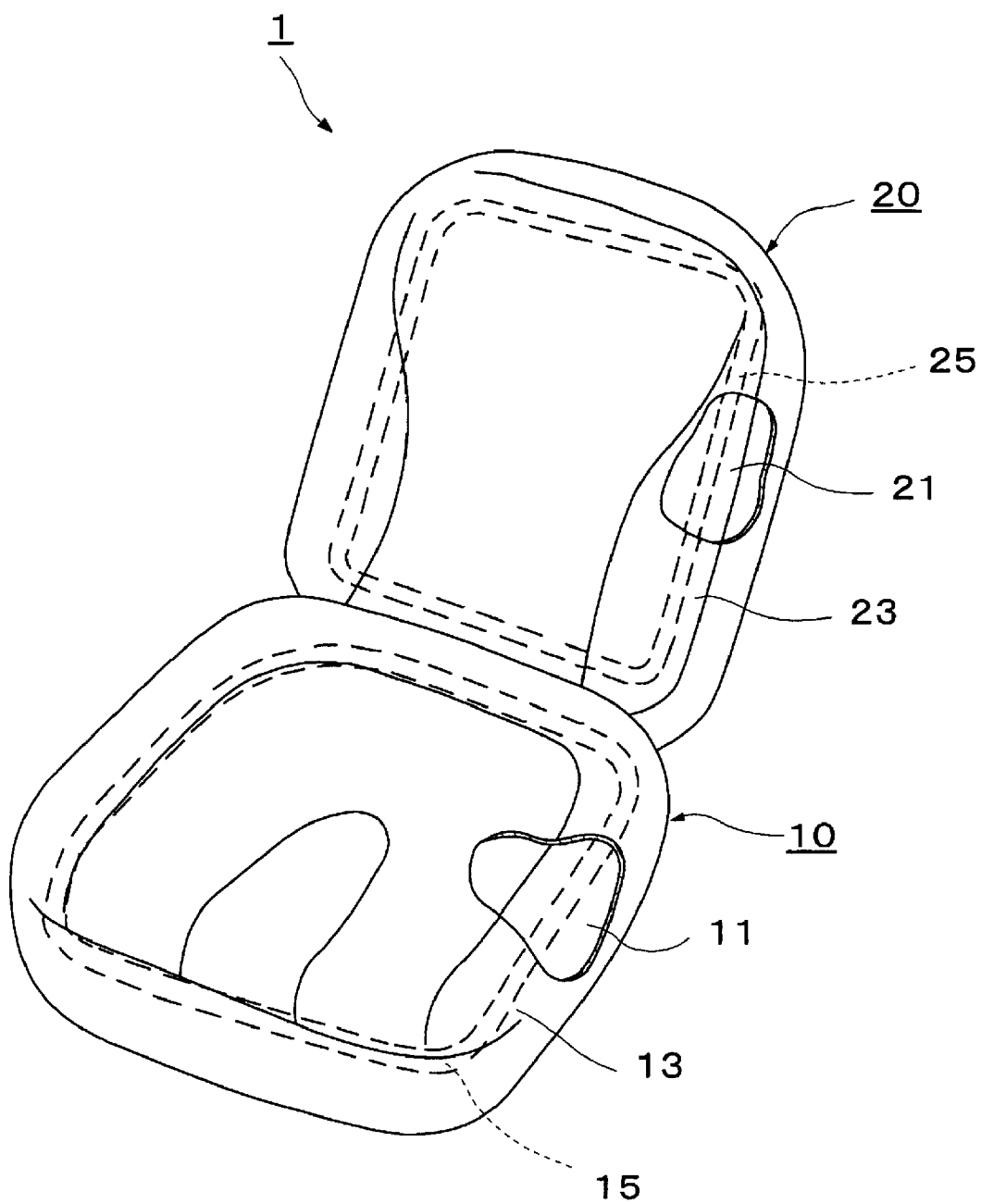
FIG. 1 is an explanatory view of a seat.

1: seat
2: web
4: sheet-like fibrous structure
10: seat portion
11, 21: cushion body
11a: sitting surface
11b: bank portion
12: groove portion
13, 23: cover
15, 25: seat frame
17: trim cord
19: engagement portion
20: seat back portion
40: mold
40a: cavity
40A: upper mold
40B: lower mold
41: steam hole
42: groove formation portion
50: high pressure steam molding machine
61: driving roller
62: hot air suction type heat treating machine

BEST MODE FOR CARRYING OUT THE INVENTION

One embodiment of the present invention will be explained below with reference to the drawings. Incidentally, parts, arrangements or the like explained below do not limit the present invention, and the present invention can be modified variously within the scope and spirit of the present invention.

Figure 2:
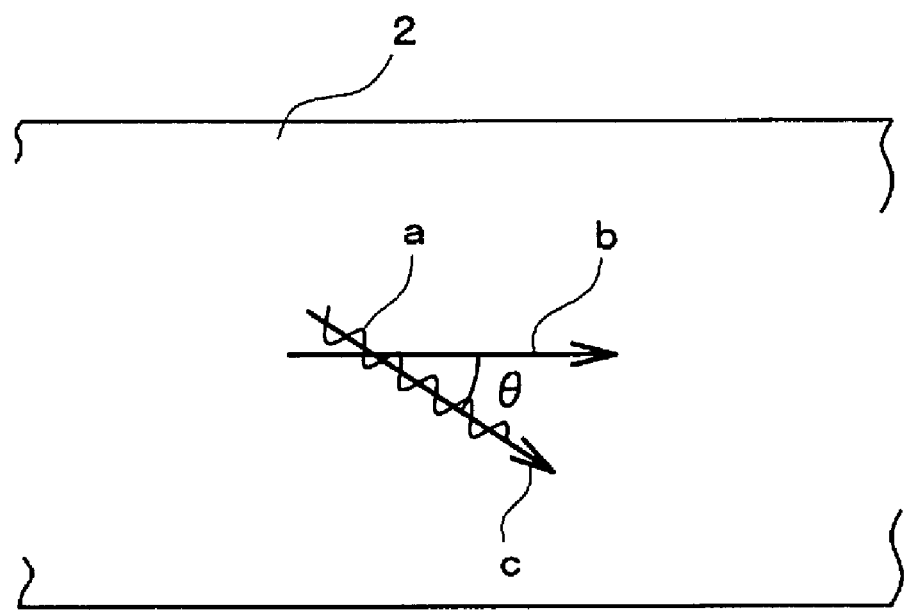
FIG. 2 is an explanatory diagram of a fiber direction of a web.
Figure 3:
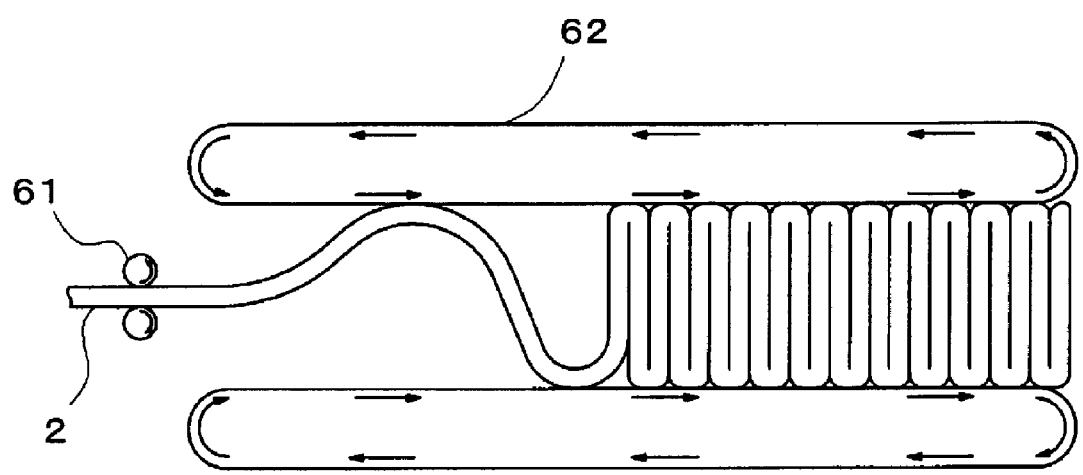
FIG. 3 is an explanatory diagram of a manufacturing step of a sheet-like fibrous structure.
Figure 4:
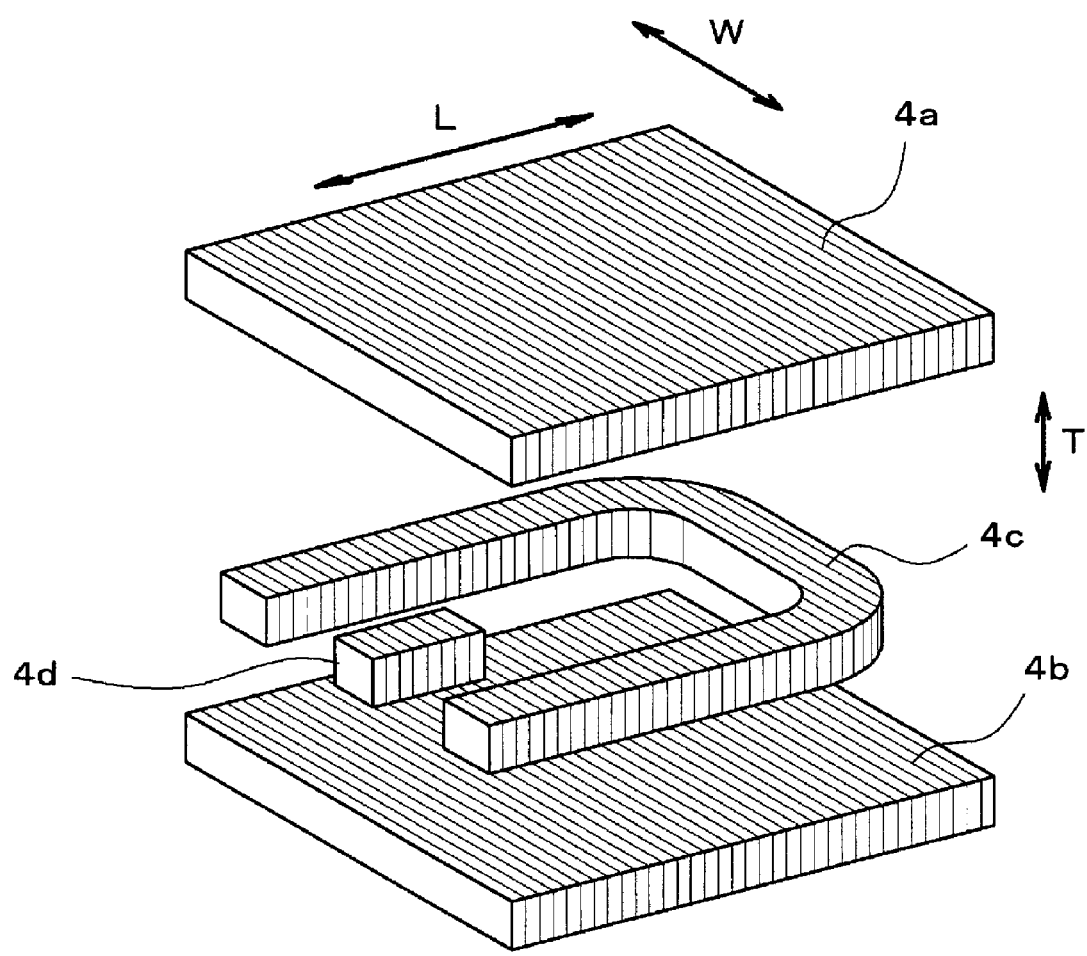
FIG. 4 is an explanatory diagram of the sheet-like fibrous structure before stacking.
Figure 5:
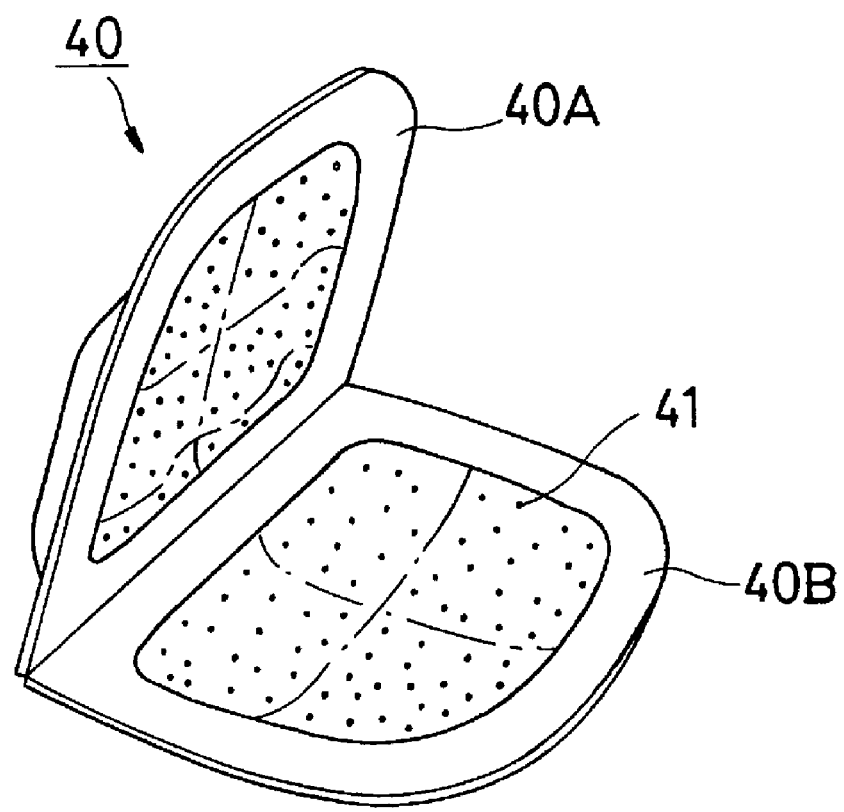
FIG. 5 is an explanatory view of a mold.
Figure 6:
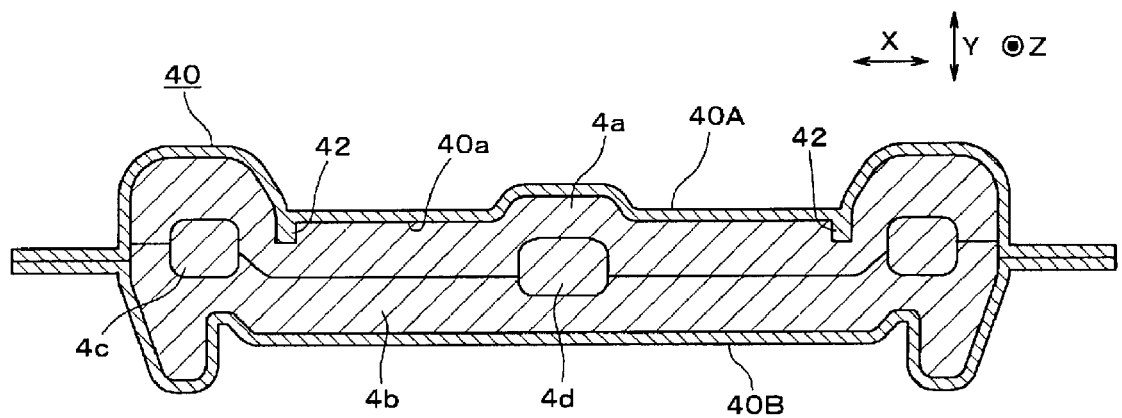
FIG. 6 is an explanatory diagram of a manufacturing step of a cushion body.
Figure 7:
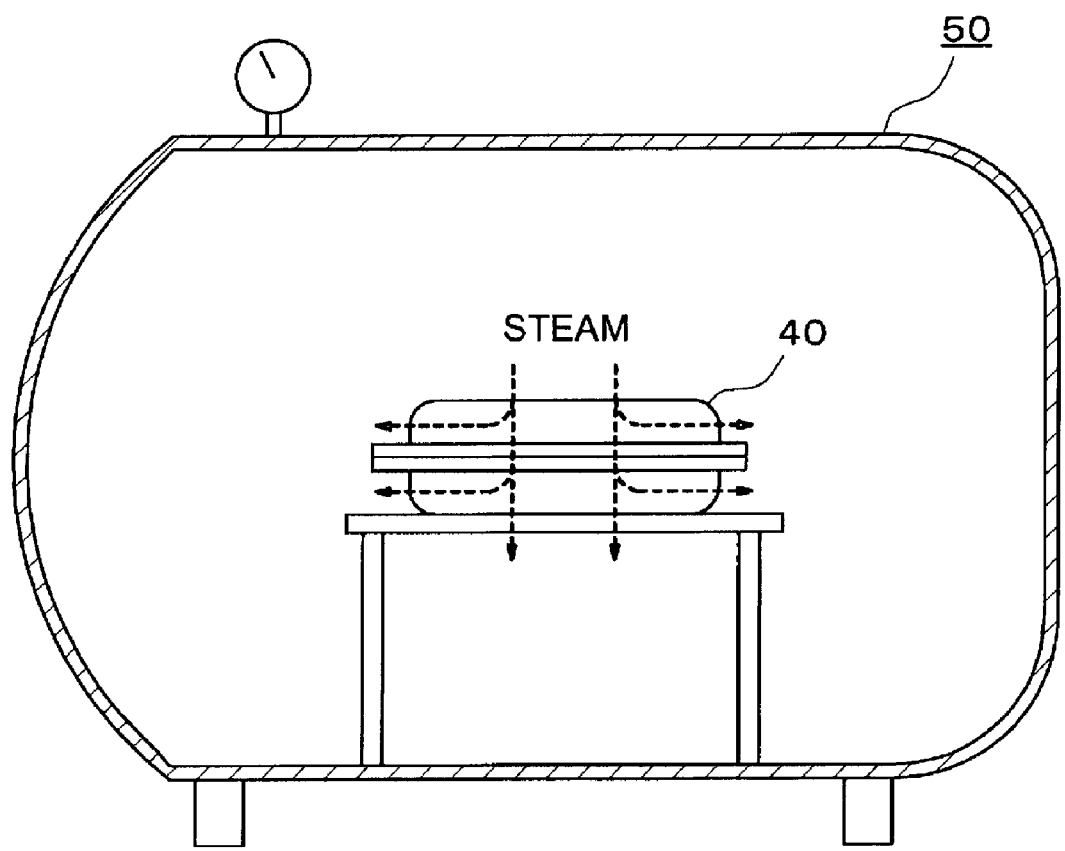
FIG. 7 is an explanatory diagram of a manufacturing step of the cushion body.
Figure 8:
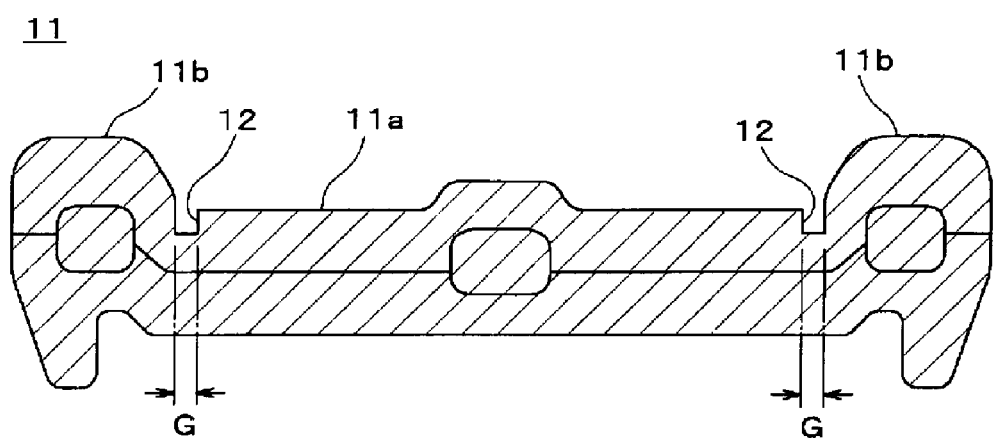
FIG. 8 is a sectional explanatory diagram of the cushion body.
Figure 9:
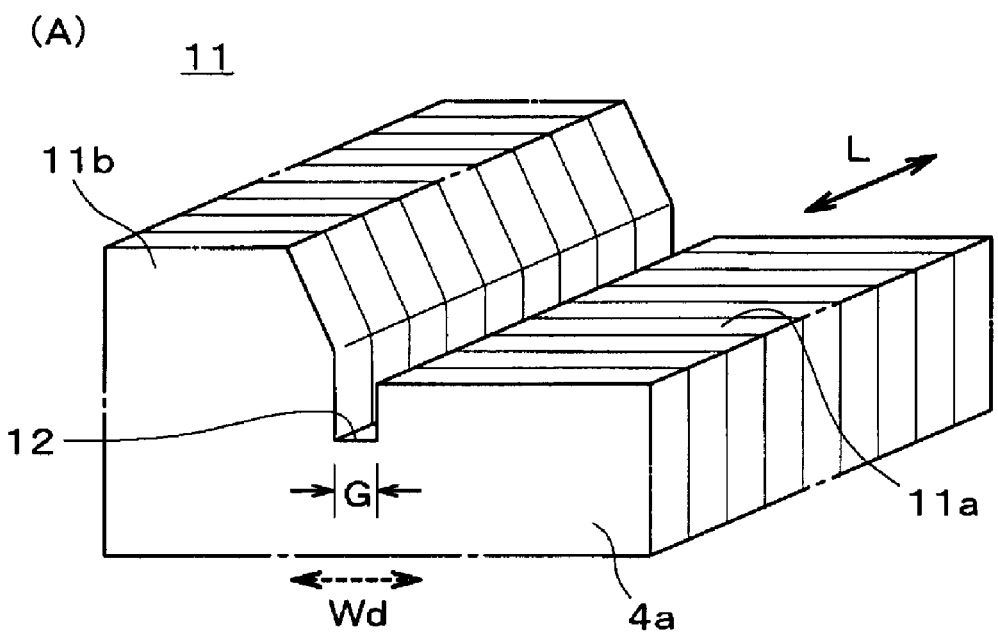
FIG. 9 is partially enlarged explanatory diagrams of the cushion body.
Figure 9:
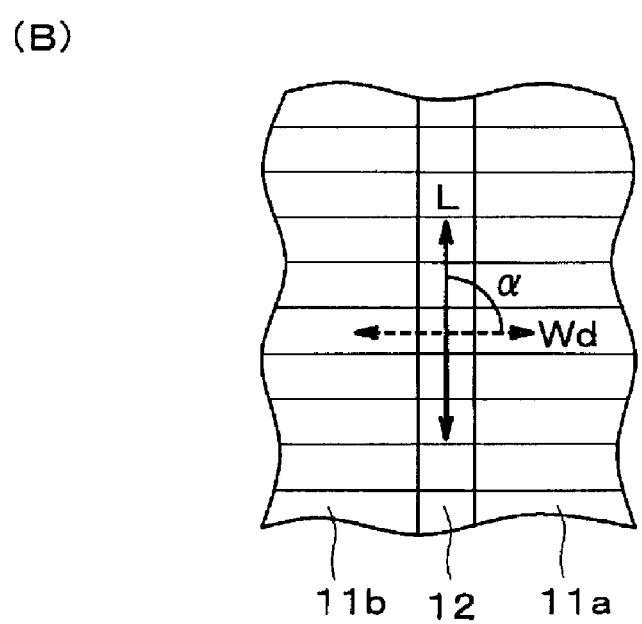

FIG. 1 to FIG. 10 show an embodiment of the present invention, FIG. 1 being an explanatory diagram of a seat, FIG. 2 being an explanatory diagram of a fiber direction in a web, FIG. 3 being an explanatory diagram of a manufacturing step of a sheet-like fibrous structure, FIG. 4 being an explanatory diagram of the sheet-like fibrous structure before stacked, FIG. 5 being an explanatory diagram of a mold; FIG. 6 and FIG. 7 being an explanatory diagrams of a manufacturing step of a cushion body; FIG. 8 being a sectional explanatory diagram of the cushion body, FIG. 9 being partially enlarged explanatory diagrams of the cushion body, and FIG. 10 being sectional views showing a state that a seat portion of the seat has been cut in a widthwise direction thereof.

A seat 1 of an embodiment can be applied to a seat for a vehicle, a train, an airplane or the like, and it may be also applied to various chairs such as a business chair or a care chair. The seat 1 of this embodiment is provided with a seat portion 10 and a seat back portion 20, as shown in FIG. 1. The seat portion 10 and the seat back portion 20 are respectively constituted such that cushion bodies 11 and 21 are placed on seat frames 15 and 25 and the cushion bodies 11 and 21 are coated with covers 13 and 23.

Regarding the cushion body of this embodiment, a forming step (a cushion body forming step) thereof will be explained taking the cushion body 11 of the seat portion 10 as an example. The cushion body 21 is also formed according to a similar method as the above. The cushion body 11 in this embodiment is formed by forming a sheet-like fibrous structure 4 as a fibrous structure where a web 2 has been folded in a standing state described later, stacking a plurality of this sheet-like fibrous structure 4 and disposing them in a mold 40 formed with a plurality of steam holes 41 which are ventilation holes on its mold face, and then, performing high pressure steam molding in a high pressure steam molding machine 50 in a state where the mold 40 has been clamped.

First, the web 2 for forming the cushion body 11 of this embodiment will be explained. The web 2 is obtained by dispersing and mixing matrix fibers composed of assemblies of inelastic crimped short fibers, and thermally adhesive composite short fibers having a melting point lower than that of the inelastic crimped short fibers and having a melting point of at least 120° C. as adhesive component.

The web 2 in this embodiment is one obtained by performing cotton blending of inelastic polyester crimped short fibers as the inelastic crimped short fibers and the thermally adhesive composite short fibers composed of thermoplastic elastomer having a melting point lower than a melting point of polyester polymer constituting the inelastic polyester crimped short fibers by 40° C. and inelastic polyester such that the fibers are mainly directed in a longitudinal direction of the web 2. The web 2 of this embodiment has a bulk property of at least 30 kg/m$^3$ and it is formed with cubic fiber crossing points between the thermally adhesive composite short fibers and between the thermally adhesive composite short fibers and the inelastic polyester crimped short fibers.

In this embodiment, hollow polyethylene terephthalate fibers with a single yarn fineness of 12 deniers and a fiber length of 64 mm, which have a cubic crimp due to anisotropic cooling are used as the inelastic polyester crimped short fibers. As the inelastic polyester crimped short fibers, the short fibers are made from ordinary polyethylene terephthalate, polytrimethylene terephthalate, polybutylene terephthalate, polyhexamethylene terephthalate, polytetramethylene terephthalate, poly-1,4-dimethylcyclohexane terephthalate, polypivalolactone, or copolymer ester thereof, cotton blended material of these fibers, composite fibers composed of two or more kinds of the above polymer components, or the like can be used. Short fibers of polyethylene terephthalate, polytrimethylene terephthalate, or polybutylene terephthalate of these short fibers are desirable. Further, potential crimped fibers composed of two kinds of polyethylene terephthalate and polytrimethylene terephthalate whose inherent viscosities are different from each other or a combination thereof, where crimps have micro-crimps due to heat treatment or the like can also be used.

Further, a sectional shape of the short fiber may be circular, oval, hyterotypic, or hollow. A thickness of this short fiber is in a range of 2 to 200 deniers, especially, preferably in a range of 6 to 100 deniers. Incidentally, when the thickness of the short fiber is small, softness increases, but elasticity of the cushion body often lowers.

Further, when the thickness of the short fiber is excessively thick, handling easiness, especially, formability of the web 2 deteriorates. Furthermore, there is a possibility that, as the number of constituent fibers decreases excessively, the number of crossing points formed between the short fibers and the thermally adhesive composite short fibers also decreases so that elasticity of the cushion body is hard to develop and simultaneously durability lowers. Furthermore, texture becomes excessively rough and hard.

In the embodiment, as the thermally adhesive composite short fibers, core/sheath type thermally melting composite fibers (a core/sheath ratio=60/40: weight ratio) with a single yarn fineness of 6 deniers and a fiber length of 51 mm, which uses thermoplastic polyether ester elastomer with a melting point of 154° C. as a sheath component and uses polybutylene terephthalate with a melting point of 230° C. as core component are used.

The thermally adhesive composite short fibers are composed of thermoplastic elastomer and inelastic polyester. Then, it is preferable that the former occupies at least ½ of a fiber surface. Regarding a weight ratio, it is appropriate that the former and the latter are in a range of 30/70 to 70/30 in a composite ratio. The thermally adhesive composite short fibers may be of a side by side type or of a sheath-core type, but the latter is desirable. In the sheath-core type, the inelastic polyester constitutes the core, but the core may be concentric or eccentric. Especially, the eccentric type is more desirable because coil-like elastic crimps are developed.

As the thermoplastic elastomer, polyurethane elastomer or polyester elastomer is desirable. Especially, the latter is appropriate. As the polyurethane elastomer, polyol with a low melting point having a molar weight of about 500 to 6000, for example, dihydroxy polyether, dihydroxy polyester, dihydroxy polycarbonate, dihydroxy polyester amide, or the like, organic diisocyanate with a molar weight of 500 or less, for example, p,p-diphenylmethane diisocyanate, tolylene diisocyanate, isophorone diisocyanate, diphenylmethane diisocyanate hydride, xylylene diisocyanate, 2,6-diisocyanate methyl caproate, hexamethylene diisocyanate, or the like, chain extender with a molar weight of 500 or less, for example, polymer obtained by reaction with glycol, amino alcohol, or triol are used. An especially desirable one of these polymers is polytetramethylene glycol as polyol, or polyurethane using poly-ε-caprolactone or polybutylene adipate. In this case, p,p'-diphenylmethane diisocyanate is desirable as an organic diisocyanate. Further, p,p'-bidihydroxy-ethoxy benzene and 1,4-butane diol are desirable as the chain extender.

On the other hand, as the polyester elastomer, polyether ester block copolymer obtained by performing copolymerization using thermoplastic polyester as a hard segment and using poly (alkylene oxide) glycol as a soft segment, more specifically, ternary copolymer composed of at least one of dicarboxylic acids selected from aromatic dicarboxylic acid such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 3-sodium sulfoisophthalic acid, alicyclic dicarboxylic acid such as 1,4-cyclohexane dicarboxylic acid, aliphatic dicarboxylic acid such as succinate, oxalic acid, adipic acid, sebacic acid dodecanedioic acid, dimer acid, ester-forming derivatives thereof, or the like; at least one of diol components selected from aliphatic diol such as 1,4-butane diol, ethylene glycol, trimethylene glycol, tetramethylene glycol, pentamethylene glycol, hexamethylene glycol, neopentyl glycol, or decamethylene glycol, or alicyclic diol such as 1,1-cyclohexan dimethanol, 1,4-cyclohexan dimethanol, or tricyclodecane dimethanol, ester-forming derivatives thereof, or the like; and at least one of poly (alkylene oxide) glycol such as polyethylene glycol, poly (1,2- and 1,3-propylene oxide) glycol, poly (tetramethylene oxide) glycol, copolymer of ethylene oxide and propylene oxide, copolymer of ethylene oxide and tetrahydrofuran, or the like, where an average molecular weight is in a range of about 400 to 5000 is used.

Considering the aspect of the adhesiveness, temperature property, and strength of the inelastic polyester crimped short fibers, block copolymerization polyether polyester using polybutylene terephthalate as a hard segment and using polyoxybutylene glycol as a soft segment is desirable. In this case, the polyester component constituting the hard segment includes terephthalic acid as the main acid component, and polybutylene terephthalate which is butylene glycol component as the main diol component. Of course, a portion (generally, 30 mol % or less) of this acid component may be replaced with another dicarboxylic acid component or oxycarboxylic acid component, and similarly a portion (generally, 30 mol % or less) of the glycol component may be replaced with dioxy component other than the butylene glycol component.

Further, the polyether portion constituting the soft segment may be polyether replaced with a dioxy component other than butylene glycol. Incidentally, various stabilizers, ultraviolet absorbent, thickening branching agent, delusterant, colorant, or other various improvers or the like may be blended in the polymer according to necessity.

It is preferable that the degree of polymerization of the polyester elastomer is in a range of 0.8 to 1.7 dl/g, especially, in a range of 0.9 to 1.5 dl/g regarding inherent viscosity. If this inherent viscosity is excessively low, a heat adhesion spot formed by the inelastic polyester crimped short fibers constituting the matrix is made breakable. On the other hand, if the inherent viscosity is excessively high, a spindle-shaped node becomes hard to be formed at a heat adhesion time.

As basic characteristics of the thermoplastic elastomer, a fracture elongation is preferably 500% or more, more preferably, 800% or more. If this elongation is excessively low, when the cushion body 11 is compressed and the deformation reaches the heat adhesion point, the coupling at this portion becomes breakable.

On the other hand, an elongation stress of the thermoplastic elastomer at 300% elongation is preferably 0.8 kg/mm$^2$ or less, more preferably, 0.8 kg/mm$^2$. If this stress is excessively large, it becomes hard for the heat-adhesion spot to disperse force applied on the cushion body 11, so that, when the cushion body 11 is compressed, the heat-adhesion spot may be broken by the force applied at that time, or even if it is not broken, the inelastic polyester crimped short fibers constituting the matrix may be also strained or crimps may fatigue.

Further, the elongation recovery ratio of the thermoplastic elastomer at 300% elongation is preferably 60% or more, more preferably, 70% or more. When this elongation recovery ratio is low, even if the cushion body 11 is compressed so that the heat-adhesion spot is deformed, recovery to its original state may become hard. It is required that these thermoplastic elastomers have melting points lower than the polymer constituting the inelastic polyester crimped short fibers and they do not cause crimps of the crimped short fibers to thermally fatigue at a hot-melting processing time for forming the heat-adhesion spot. Therefore, the melting point is preferably lower than the melting point of the polymer constituting the short fibers by 40° C. or more, more preferably, by 60° C. or more. Such a melting point of the thermoplastic elastomer can be set to a temperature in a range of 120 to 220° C., for example.

When the difference in melting point is smaller than 40° C., a heat treatment temperature at a melting processing time described later is excessively high, and fatigue of crimps of the inelastic polyester crimped short fibers is caused, which results in lowering of mechanical properties of the crimped short fibers. Incidentally, regarding the thermoplastic elastomer, when its melting point can not be observed clearly, a softening point thereof is observed instead of the melting point.

On the other hand, as the inelastic polyester crimped short fibers used as a mating component of the thermoplastic elastomer in the composite fibers, polyester polymers constituting the crimped short fibers forming the matrix, such as described above, are adopted, but polyethylene terephthalate, polymethylene terephthalate, or polybutylene terephthalate is more preferably adopted among them.

The above-described composite fibers are dispersed and blended in a range of 20 to 100%, preferably, 30 to 80% based upon weight of the web 2. In the web 2 in this embodiment, the thermally adhesive composite short fibers as the binder fibers and the inelastic crimped short fibers as the main fibers are cotton-blended at a weight ratio of 60:40.

When the dispersion and blend ratio of the composite fibers is excessively low, the number of heat-adhesion spots is reduced, so that the cushion body 11 may become easily deformable, or elasticity, repulsive property, and durability may lower. Further, cracks between tops arranged may occur.

In the embodiment, the inelastic polyester crimped short fibers and the thermally adhesive composite short fibers are cotton-blended at the weight ratio of 40:60, and they are formed in the web 2 of coating weight 20 g/m$^2$ through a roller card.

The web 2 in this embodiment is formed such that a ratio of fibers oriented in the lengthwise direction of the web is relatively higher than that of fibers oriented in a lateral direction. That is, the web 2 in this embodiment is formed so as to satisfy a relationship of $C \geq 3D/2$, preferably, $C \geq 2D$ per unit volume. When the total numbers of the fibers C oriented in the lengthwise direction (a continuous direction) in this continuous web 2 and the fibers D oriented in the lateral direction (a widthwise direction of the web) are examined, it can be confirmed that C:D=2:1.

Here, as shown in FIG. 2, the fibers oriented in the lengthwise direction of the web 2 are fibers satisfying such a condition that an angle θ of the lengthwise direction of the fibers to the lengthwise direction of the web is in a range of $0° \leq \theta \leq 45°$, while the fibers oriented in the lateral direction (the widthwise direction of the web) are fibers satisfying such a condition that the angle θ is in a range of $45° < \theta \leq 90°$. In the figure, reference symbol a represents fibers constituting the web, reference symbol b represents the lengthwise direction (extending direction) of the web, and reference symbol c represents the fiber direction constituting the web. Further, regarding the orientation of the fibers constituting the sheet-like fibrous structure, a thickness direction of the sheet-like fibrous structure and a direction extending along a direction perpendicular to a thickness direction thereof mean directions within a range of ±45° to these directions.

A direction where each fiber direction can be confirmed by extracting random portions in a surface layer portion and an inner layer portion of the web 2 to observe them using a transmission type optical microscope. Incidentally, the thickness of the web 2 is 5 mm or more, preferably, 10 mm or more, further preferably 20 mm or more, Generally, the web 2 has a thickness of 5 to 150 mm.

Next, the web 2 formed such that fibers mainly extend along the lengthwise direction is folded like an accordion such that it has a predetermined density and a desired thickness as a structural body, so that cubic fiber crossing points are formed between the composite fibers and between the inelastic polyester crimped short fibers and the composite fibers, and heat treatment is then performed at a temperature (to 80° C.) lower than the melting point of the polyester polymer and higher than the melting point (or a fluidization start point) of the thermoplastic elastomer, so that elastomer components are melt-adhered at the fiber crossing points and flexible heat-adhesion spots are formed.

Specifically, as shown in FIG. 3, the web 2 is folded to an accordion shape by pushing the web 2 into a hot-air suction type heat treatment machine 62 (a length of a heat treatment zone is 5 m and a moving velocity is 1 m/min) by a driving roller 61 with a roller surface velocity of 2.5 m/min and it is formed in a heat-adhered sheet-like fibrous structure 4 with a thickness of 25 mm by treating the web 2 at 190° C. for 5 minutes using Struto equipment (a fibrous structure forming step).

Adhesion spots thermally adhering in a state the thermally adhesive composite short fibers have crossed one another and adhesion spots thermally adhering in a state that the thermally adhesive composite short fibers and the inelastic crimped short fibers have crossed one another are dispersed in the sheet-like fibrous structure 4 thus formed. It is appropriate for developing cushioning properties, ventilation properties, and elasticity that the density of the sheet-like fibrous structure 4 is in a range of 0.015 to 0.20 g/cm$^3$.

By forming the web 2 formed such that their fibers extend along the lengthwise direction in a folding manner, the sheet-like fibrous structure 4 is formed such that the number of fibers oriented in the thickness direction is larger than that of fibers oriented in a direction perpendicular to this thickness direction and a direction of the fibers mainly becomes parallel to the thickness direction. That is, the sheet-like fibrous structure 4 in the embodiment is formed such that when the total number of fibers arranged along in the thickness direction is represented as A and the number of fibers arranged along the direction perpendicular to the thickness direction is represented as B regarding per unit volume, a relationship of A≧3B/2, preferably, A≧2B is satisfied.

Next, the sheet-like fibrous structure 4 is cut in a predetermined shape, and cut pieces are stacked in a vertical direction (a thickness direction T), as shown in FIG. 4. In this embodiment, a substantially rectangular sheet-like fibrous structure 4a, a sheet-like fibrous structure 4b, a U-shaped sheet-like fibrous structure 4c with a U shape for forming a bank portion of the cushion body 11, and a protrusion-shaped sheet-like fibrous structure 4d for forming a protrusion portion to be slightly protruded between both thighs of a seat occupant are cut, and the U-shaped sheet-like fibrous structure 4c and the protrusion-shaped sheet-like fibrous structure 4d are sandwiched between the sheet-like fibrous structure 4a with and the sheet-like fibrous structure 4b.

These sheet-like fibrous structures 4a to 4d are stacked in their thickness direction T. Also, the sheet-like fibrous structures 4a to 4d are disposed in a direction so that a stacking direction L of the web 2 crosses a widthwise direction W of the cushion body 11 at a right angle. Further, holt-melt films, hot-melt unwoven cloths, hot-melt adhesives, or the like are arranged at portions where the sheet-like fibrous structures 4a to 4d abut on one another according to necessity.

The sheet-like fibrous structures 4a to 4d thus stacked are arranged in a mold 40 such as shown in FIG. 5 and compressed (a fibrous structure arranging step). The mold 40 of this embodiment is composed of an upper mold 40A and a lower mold 40B. When the upper mold 40A and the lower mold 40B are fastened, a cavity 40a having a desired undulation shape of the cushion body 11 is formed (See FIG. 6). Further, steam holes 41 are formed on a portion or a whole of a mold face of the mold 40. The mold 40 can be formed using a metal such as iron, steel, aluminum, glass fiber, or carbon fiber, or it may be formed of any synthetic resin.

FIG. 6 is a sectional view of a state that the sheet-like fibrous structures 4a to 4d have been disposed in the mold 40 and the mold 40 has been fastened. The sheet-like fibrous structures 4a to 4d are formed to be larger than the cavity 40a of the mold 40 in a natural state by about 1.2 to 3.0 times in volume. Accordingly, the sheet-like fibrous structures 4a to 4d are changed to a state that they have been compressed to the shape of the cavity 40a at a mold fastening time.

At the upper mold 40A, a groove formation portion 42 is formed so as to protrude from the mold face. This groove formation portion 42 is for forming a groove portion 12 (See FIG. 8) with a predetermined width in a recess state in the thickness direction of the cushion body 11 (or the sheet-like fibrous structure 4a) so as to separate a sitting surface 11a and a bank portion 11b of the cushion body 11 from each other and is formed so as to substantially follow a depth direction (Z-direction in FIG. 6) in the upper mold 40A. In this embodiment, the sheet-like fibrous structures 4a to 4d are disposed in the mold 40 in a compressed state so that the protrusion direction of the groove formation portion 42 (Y-direction in this embodiment) is along the thickness direction of the sheet-like fibrous structure 4a (Y-direction in this embodiment) and the stacking direction of the web 2 constituting the sheet-like fibrous structure 4a (Z-direction in this embodiment) and the widthwise direction of the groove formation portion 42 (X-direction in this embodiment) form a predetermined angle or more.

In this embodiment, the sheet-like fibrous structure 4a is disposed so that the stacking direction of the web 2 constituting the sheet-like fibrous structure 4a and the widthwise direction of the groove formation portion 42 substantially cross each other at a right angle. As will be described later, an angle formed by the stacking direction of the web 2 constituting the sheet-like fibrous structure 4a and the widthwise direction of the groove formation portion 42 is most preferably approximately 90° but it may be approximately 20° or more. It is preferably 45° or more.

Next, as shown in FIG. 7, the mold 40 in which the sheet-like fibrous structures 4a to 4d have been disposed is entered into a high pressure steam molding machine 50. And the inside of the high pressure steam molding machine 50 is pressurized to 2 to 8 barometrical pressure higher than atmospheric pressure and steam of approximately 120 to 180° C. is blown to the mold 40 (molding step) for one to three minutes. After steam is blown to the mold 40, cooling and mold-releasing are performed to obtain a cushion body 11 (cooling and mold-releasing step).

In the molding step of this embodiment, a temperature inside the high pressure steam molding machine 50 is controlled such that steam with a molding temperature can be blown to the molding 40. Here, the molding temperature is a temperature higher than a melting point of the thermally adhesive composite short fibers serving as the binder fibers, namely, higher than a melting point of thermoplastic elastomer, and lower than a melting point of matrix fibers (the inelastic crimped short fibers) serving as the main fibers. In order to raise a temperature of steam to the molding temperature, a temperature inside the high pressure steam molding machine 50 is first raised to the molding temperature by a heater (not shown) and a pressure inside the high pressure steam molding machine 50 is raised from an ambient atmospheric pressure (about 1 atm) to at least saturated steam pressure of steam or higher in the molding temperature.

In this embodiment, since the melting point of the binder fibers is about 154° C., the molding temperature is set to 161° C. that is higher than the melting point. In this embodiment, then, the temperature inside the high pressure steam molding machine 50 is raised up to the molding temperature of 161° C. in about 30 seconds and the pressure inside the high pressure steam molding machine 50 is raised to atmospheric pressure of about 5.5 atm (about 0.557 MPa) at which a boiling point of water ($H_2O$) serving as heat conduction material becomes the molding temperature of 161° C. That is, the saturated steam pressure at the molding temperature of 161° C. is about 5.5 atm.

In the molding step, water vapor with the molding temperature is blown to the mold 40 in a state that the temperature and the pressure inside the high pressure steam molding machine 50 have been kept in the molding temperature and a predetermined pressure. In this embodiment, molding is performed by blowing steam to the mold 40 for about one minute and 10 seconds. Thereafter, the temperature inside the high pressure steam molding machine 50 is lowered to the molding temperature or lower in about one minute and the pressure inside the high pressure steam molding machine 50 is reduced to an ambient atmospheric pressure. Then, the mold 40 is taken out of the high pressure steam molding machine 50 to be cooled (a cooling step), and the cushion body 11 thermally molded is released from the mold 40 (a mold-releasing step). In this embodiment, tact time for thermally molding the cushion body 11 in the high pressure steam molding machine 50 can be set to about 3 to 5 minutes.

By blowing steam at the molding temperature to the mold in this manner, steam enters in the sheet-like fibrous structures 4a to 4d having ventilation properties from steam holes 41 of the mold 40, and it exits from other steam holes 41 to the outside of the mold 40. The sheet-like fibrous structures 4a to 4d are disposed in the mold 40 in their compressed state, and crossing points between the thermally adhesive composite short fibers and between the thermally adhesive composite short fibers and the inelastic crimped short fibers are caused to thermally adhere to one another due to steam heat so that the cushion body is formed in the shape of the cavity 40a of the mold 40.

Further, hot-melt films, hot-melt unwoven clothes, hot-melt adhesives, or the like disposed among the sheet-like fibrous structures 4a to 4d are melted due to steam heat and the sheet-like fibrous structures 4a to 4d are fixed to one another. Thus, fibers in the sheet-like fibrous structures 4a to 4d are caused to thermally adhere to one another due to steam and the sheet-like fibrous structures 4a to 4d are fixed to one another by the hot-melt film, a hot-melt unwoven cloth, hot-melt adhesive, or the like, so that a cushion body 11 with a predetermined shape is formed. Incidentally, dish cloth may be inserted on a surface according to necessity, or wires made from steel or the like may be inserted among the sheet-like fibrous structures 4a to 4d.

When steam at the molding temperature is blown to the mold 40 inside the high pressure steam molding machine 50 raised up to the saturated steam pressure like this embodiment, a molding time can be largely reduced. That is, since steam at the molding temperature has a thermal capacity larger than that of hot air, the binder fibers can be melted in a short time.

In the cushion body 11 in this embodiment, the sheet-like fibrous structures 4a to 4d, where the directions of the fibers are oriented in the thickness direction T, are stacked and the high pressure steam molding is performed. Accordingly, the fibers constituting the cushion body 11 are arranged along a direction in which load acts when a seat occupant sits on the seat 1. With such a constitution, the cushion body 11 in this embodiment has ventilation properties and can secure a proper hardness to a stress direction, and it provides dispersibility of stress and excellent durability. That is, since the extending direction of the web 2 is oriented to the load direction in this embodiment, it is possible to support a large load while a soft touch feeling is ensured without increasing hardness of the cushion body 11 so much.

Further, the cushion body 11 in this embodiment is molded in a state that it has been compressed by the mold 40, and it can take a three-dimensional and complicated undulation shape so as to conform with the shape of the cavity 40a of the mold 40. At this time, cushioning feeling can be adjusted partially according to a compression degree in the mold 40.

FIG. 8 shows a sectional view of the cushion body 11. As shown in FIG. 8, the cushion body 11 of this embodiment is provided with the sitting surface 11a brought into contact with a seat occupant at sitting and receiving its load and the bank portion 11b formed on both sides of the sitting surface 11a and raised to an upper part, and between the sitting surface 11a and the bank portion 11b, the groove portion 12 having a predetermined width G is formed.

FIGS. 9A and 9B are enlarged views showing the vicinity of the groove portion 12. As shown in FIGS. 9A and 9B, the cushion body 11 of this embodiment is formed so that the widthwise direction Wd of the groove portion 12 and the stacking direction L of the web 2 constituting the sheet-like fibrous structure 4a substantially cross each other at a right angle. That is, the angle α formed by the widthwise direction Wd and the stacking direction of the web 2 is approximately 90°. If the widthwise direction of the groove portion 12 and the stacking direction of the web 2 become parallel or close to parallel, the groove portion 12 is opened in the widthwise direction Wd and the shape of the groove portion 12 becomes easily slack.

On the other hand, if the groove portion 12 is formed so that the widthwise direction Wd of the groove portion 12 and the stacking direction L of the web 2 has a predetermined angle as in this embodiment, the shape of the groove portion 12 does not become slack but the groove portion 12 can not be made easier to open in the widthwise direction Wd. As mentioned above in this embodiment, the groove portion 12 can be provided on the surface of the cushion body 11, and moreover, a favorable shape of the groove portion 12 can be maintained. Thereby, a favorable appearance of the cushion body 11 can be maintained. Incidentally, in this embodiment, the angle α formed by the widthwise direction Wd of the groove portion 12 and the stacking direction L of the web 2 is set to be approximately 90°, but not limited to that, they can be configured so that a predetermined angle or more is formed. That is, the angle α is most preferably approximately 90° but it may be approximately 20° or more. It is preferably 45° or more.

Though the cushion body 11 has been explained above, a cushion body 21 for the seat back portion may be similarly formed. Then, a seat 1 is formed by arranging the cushion bodies 11 and 21 thus formed on the sheet frames 15 and 25 and coating them with covers 13 and 23 (an assembling step).

Incidentally, when the cushion body 11 is formed, the cover 13, and the sheet-like fibrous structures 4a to 4d are stacked via hot-melt films, hot-melt unwoven clothes, hot-melt adhesives, or the like, and they are disposed in the mold 40, so that high pressure steam forming may be performed. Thereby, the cover 13 can be formed integrally with the cushion body 11. The cover 23 may be similarly handled.

Also, in the above embodiment, the groove portion 12 is provided at the boundary between the sitting surface 11a and the bank portion 11b, but is not limited to that. The groove portion 12 may be provided so as to separate the sitting surface 11a.

Also, in the above embodiment, the steam holes 41 are formed at the upper mold 40A and the lower mold 40B of the mold 40, but the steam holes 41 are not limited to that arrangement. The steam holes 41 may be formed only on the lower mold 40B forming a face on the back side of the cushion body 11 without forming the steam holes 41 on the upper mold 40A forming a face on the front side of the cushion body 11. With such configuration, the face on the front side of the formed cushion body 11 (contact surface with the seat occupant) can be made with a soft touch feeling.

Furthermore, in the embodiment, the cushion bodies 11 and 21 obtained by stacking the sheet-like fibrous structure 4 to perform the high pressure steam forming are used for the seat portion 10 and the seat back portion 20, but the present invention is not limited to this constitution, and a cushion body obtained by stacking sheet-like fibrous structure 4 to perform high pressure steam forming may be used at a portion on which load due to seat occupant sitting acts, such as an arm rest or a head rest.

Figure 10:
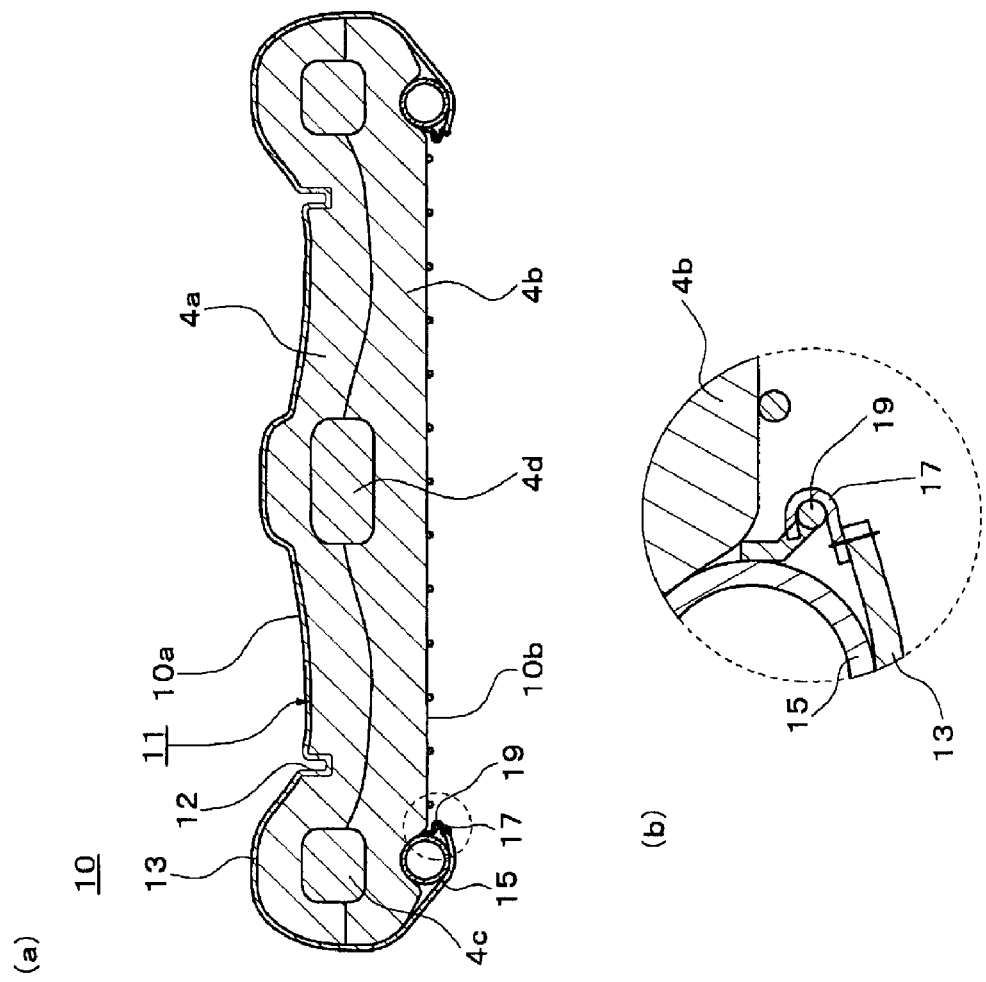
FIG. 10 is sectional views showing a state that a seat portion of the seat has been cut in a widthwise direction thereof.

Next, details of a seat using the cushion body 10 will be explained. FIG. 10 is a sectional view showing a state that a seat portion of a seat has been cut in a widthwise direction, FIG. 10 (a) being a view showing the whole of the seat portion, and FIG. 10 (b) being a view showing a region circled in FIG. 10 (a) in an enlarged manner. As shown in FIG. 10 (a), the seat portion 10 includes a cushion body 11, a cover 13, and a seat frame 15. As shown in FIG. 10 (b), a surface of the cushion body 11 is coated with the cover 13, and a trim cord 17 made from resin is sewn to an end portion of the cover 13. The trim cord 17 is formed to have an about J shape in section, and a member such as a string can be hooked on a bent portion formed at a distal end of the trim cord 17. On the other hand, an engagement portion 19 is provided inside the seat frame 15 in a projecting manner. A wire is provided on the side of a distal end of the engagement portion 19. The cover 13 can be fixed to the seat frame 15 by hooking the bent portion of the trim cord 17 on the wire of the engagement portion 19.

Next, a method for manufacturing a seat portion 10 of a seat for a vehicle will be explained in detail. First, a hot-melt film is caused to adhere to a surface of the cushion body 11 before the high pressure steam forming, and the surface is coated with the cover 13. Next, the cushion body 11 whose surface is coated with the cover 13 is introduced into a high pressure steam molding machine, wherein high pressure steam molding is performed so that the cushion body 11 and the cover 13 are formed integrally.

The molded cushion body 11 is taken out of the high pressure steam molding machine, and it is left for a while to dry. After drying, the trim cord 17 made from resin is sewn on the end portion of the cover 13. Next, winkles of a surface of the seat portion 10 are removed by pulling the end portion of the cover 13 and the trim cord 17 is hooked to the engagement portion 19. The above is directed to explanation about the seat portion 10 of the seat 1, but the seat back portion 20 can also be manufactured according to similar steps.

The invention claimed is:

1. A cushion body comprising:
 a fibrous structure having a predetermined shape, wherein the fibrous structure includes a stacking of folds of a web along a stacking direction, wherein the web includes a mix of main fibers and binder fibers, and wherein an extending direction of the web is along a thickness direction of the fibrous structure and is disposed so that a thickness direction of the fibrous structure is along a thickness direction of the cushion body; and,
 a groove having a predetermined width in a relaxed state of the fibrous structure, wherein the groove extends in the thickness direction of the fibrous structure and is formed in the cushion body, wherein the groove includes a widthwise direction formed at a predetermined angle with the stacking direction of the web constituting the fibrous structure, and wherein the predetermined angle is greater than zero.

2. The cushion body according to claim 1, wherein the widthwise direction substantially crosses the stacking direction at a right angle.

3. The cushion body according to claim 1, wherein the cushion body comprises a molded cushion body resulting from the fibrous structure being molded by blowing steam under barometrical pressure to the fibrous structure through steam holes formed through a mold face of a mold, and wherein the barometrical pressure is higher than atmospheric pressure.

4. The cushion body according to claim 3, wherein the barometrical pressure comprises a saturated steam pressure at a temperature at or above a melting point of the binder fibers and lower than a melting point of the main fibers.

5. The cushion body according to claim 1, wherein the cushion body comprises a molded cushion body resulting from the fibrous structure being molded by blowing steam to the fibrous structure through steam holes formed through a mold face of a mold, wherein the steam holes are not formed in a region forming a contact surface with a seat occupant in the cushion body, and wherein the steam holes are formed in a region forming a face on a side opposite the contact surface.

6. A seat including a cushion body and a seat frame supporting the cushion body, wherein the cushion body comprises a cushion body according to any one of claims 1 to 5.

7. The cushion body according to claim 1, wherein the predetermined angle is greater than 20°.

8. The cushion body according to claim 1, wherein the predetermined angle is greater than 45°.

* * * * *